United States Patent
Murray (10) Patent No.: US 12,134,427 B2
(45) Date of Patent: Nov. 5, 2024

(54) VEHICLE

(71) Applicant: Gordon Murray Design Limited, Shalford (GB)

(72) Inventor: Ian Gordon Murray, Puttenham (GB)

(73) Assignee: Gordon Murray Automotive Limited, Shalford (GB)

( * ) Notice: Subject to any disclaimer, the term of this patent is extended or adjusted under 35 U.S.C. 154(b) by 342 days.

(21) Appl. No.: 17/634,662

(22) PCT Filed: Jul. 30, 2020

(86) PCT No.: PCT/EP2020/071531
§ 371 (c)(1),
(2) Date: Feb. 11, 2022

(87) PCT Pub. No.: WO2021/028234
PCT Pub. Date: Feb. 18, 2021

(65) Prior Publication Data
US 2022/0355871 A1 Nov. 10, 2022

(30) Foreign Application Priority Data
Aug. 13, 2019 (GB) ...................................... 1911586

(51) Int. Cl.
*B62D 35/00* (2006.01)
*B62D 37/02* (2006.01)

(52) U.S. Cl.
CPC ............. *B62D 35/00* (2013.01); *B62D 37/02* (2013.01)

(58) Field of Classification Search
CPC ................................ B62D 35/00; B62D 37/02
See application file for complete search history.

(56) References Cited

U.S. PATENT DOCUMENTS 4,384,630 A 5/1983 Steiner
10,160,329 B2 * 12/2018 Abou-Zeid .............. B60H 1/24
(Continued)

FOREIGN PATENT DOCUMENTS

CN 106379428 B 1/2019
DE 102004029283 A1 * 1/2006 ............. B60K 11/08
(Continued)

OTHER PUBLICATIONS

International Search Report and Written Opinion issued for PCT/EP2020/071531, dated Nov. 2, 2020, 10 pages.

*Primary Examiner* — Lori Lyjak
(74) *Attorney, Agent, or Firm* — Z. Peter Sawicki; Amanda M. Prose; Westman, Champlin, & Koehler PA (57) ABSTRACT

A vehicle has external bodywork including an upper surface and an under surface, the under surface having at least one aperture, and the vehicle comprising lower ducting located within the external bodywork and communicating with that aperture, the upper surface having at least one aperture, and the vehicle comprising upper ducting located within the external bodywork and communicating with that aperture, the upper ducting and the lower ducting leading to a fan adapted to selectively draw air through the respective ductings, the vehicle further comprising a control unit adapted to receive information as to the vehicle dynamic state and, in the light of that state, draw air through the lower ducting or through the upper ducting. Thus, a choice can be made between enhanced levels of downforce on the one hand, and low drag on the other. By providing pre-set thresholds for parameters such as speed, g-force, vehicle attitude or the like within the control unit, the car can be tailored so that it is optimised for low drag during high speed straight-line driving, when tight cornering is unlikely, and optimised for
(Continued)

greater downforce when lateral grip is more likely to be needed.

19 Claims, 7 Drawing Sheets

(56) References Cited

U.S. PATENT DOCUMENTS

| | | | | |
|---|---|---|---|---|
| 2006/0001292 A1* | 1/2006 | Shahbazi | ............... | B62D 35/00 |
| | | | | 296/180.1 |
| 2006/0170245 A1* | 8/2006 | Shahbazi | ............... | B62D 35/00 |
| | | | | 296/180.1 |
| 2006/0170248 A1* | 8/2006 | Shahbazi | ............... | B62D 35/00 |
| | | | | 296/180.1 |
| 2011/0100731 A1 | 5/2011 | Hassan | | |
| 2022/0355871 A1* | 11/2022 | Murray | ................. | B62D 35/00 |

FOREIGN PATENT DOCUMENTS

| | | | | |
|---|---|---|---|---|
| FR | 2893903 A1 * | 6/2007 | ............. | B60H 1/265 |
| FR | 2058669 A5 | 2/2022 | | |
| GB | 2068851 A * | 8/1981 | ............. | B62D 35/00 |
| GB | 2269142 A * | 2/1994 | ............. | B62D 37/02 |
| WO | 2017/211018 A1 | 12/2017 | | |
| WO | WO-2018154592 A1 * | 8/2018 | ............ | B60F 3/0007 |

* cited by examiner

VEHICLE

CROSS-REFERENCE TO RELATED APPLICATION

This Application is a Section 371 National Stage Application of International Application No. PCT/EP2020/071531, filed Jul. 30, 2020 and published as WO2021/028234 on Feb. 18, 2021, in English, which claims priority to GB1911586.4, filed Aug. 13, 2019, the contents of which are hereby incorporated by reference in their entireties.

FIELD OF THE INVENTION

The present invention relates to a vehicle.

BACKGROUND ART

The two fundamental requirements of a vehicle are that it be able to move forward and change velocity. A sports car seeks to maximise both capabilities, by permitting a high rate of acceleration to a high top speed, exceptional braking power and stability, and allowing good cornering ability even at all road speeds. However, these are often seen as contradictory; high cornering performance requires a high level of lateral acceleration, which is provided via the grip produced by the tyres. This is the result of downforce exerted on the tyres by the vehicle weight and aerodynamics, and as the weight should be minimised (for numerous reasons) that means the downforce needs to be produced aerodynamically. This is straightforward to do, by providing wings and other aerodynamic devices, but these impose a drag penalty and can dominate the visual appearance of the vehicle.

Thus, the higher level of downforce needed to produce sufficient grip to achieve high-speed cornering performance brings with it a level of drag that reduces the straight-line top speed performance of the vehicle and impacts vehicle efficiency. The result is a choice for the design engineer, who must select an appropriate balance between the two. Generally, to escape that trade-off requires that the drag effect of the aerodynamic devices must be overcome by a higher-power engine, which inevitably imposes a weight penalty on the vehicle. Typically, most modern hypercars are from around 1,400 kg as a result.

In a racing context, Lotus introduced the concept of "ground effect" in 1977 with the Type 78 vehicle. By carefully shaping the underside of the car, the air passing under the car is accelerated, thereby reducing the air pressure under the car relative to that over it and creating additional downforce. The increased downforce gave more grip and thus higher cornering speeds. As compared to a wing (for example), ground effect is a relatively low drag solution; there is still some additional drag but less than is created by a wing. This was developed further by the present inventor in the form of the Brabham BT46B which was equipped with a rear-mounted engine-driven fan which both cooled the engine and also drew air from beneath the car. As a result, the BT46B was notably faster, with the principal limitation in its cornering performance being the ability of the driver to cope with the lateral acceleration that was produced.

Both the Type 78 and the BT46B needed side skirts in order to prevent ingress of air from the sides of the car, which would otherwise neutralise the pressure differential and remove the ground effect. The sealing skirts contacted the ground and prevented significant lateral ingress of air. This is obviously impractical on a road car, so other approaches have been taken in recently-designed hypercars. Most provide large wings in combination with high-powered engines, and accept the resulting weight penalty. Others seek to provide a selectable balance between the two factors. For example, the Bugatti Veyron allows the driver to select a "top speed" mode; this requires use of a key-operated switch whilst the car is at rest, accessible only whilst the driver's door is open. In this mode, the rear spoiler retracts, the front air diffusers shut, and usual ground clearance of 12.5 cm drops to 6.5 cm. However, the driver must complete a checklist to confirm that they understand that the handling of the vehicle will be impaired. As a result, the process is inflexible and (deliberately) inconvenient.

More recently, the McLaren P1 includes variable suspension and wing geometry. This permits the driver to select a preferred mode which is then implemented by retracting or extending the wing, adjusting the wing angle, and/or adjusting the suspension ride height. Again, the driver must choose the desired mode, and the systems that provide the necessary adjustment add weight to the car. The P1, like modern Formula 1 cars, also includes a 'Drag Reduction System' ("DRS") which allows the position and attitude of the wing to be adjusted so as to reduce both drag and downforce at moments when additional speed is required in a straight line.

GB2269142, an earlier application by the present inventor, describes a ground-effect vehicle whose centre of pressure can be varied by activating a fan to draw air from a rear diffuser. This can be carried out in response to heavy braking, for example, to adjust the fore/aft location of the centre of pressure of the ground effect so as to maintain the font/rear balance of the vehicle.

SUMMARY OF THE INVENTION

The present invention provides a vehicle having external bodywork including an upper surface and an under surface, the under surface having at least one aperture, and the vehicle comprising lower ducting located within the external bodywork and communicating with that aperture, the upper surface having at least one aperture, and the vehicle comprising upper ducting located within the external bodywork and communicating with that aperture, the upper ducting and the lower ducting leading to a fan adapted to selectively draw air through the respective ductings, the vehicle further comprising a control unit adapted to receive information as to the vehicle dynamic state and, dependent on that state, draw air through the lower ducting or through the upper ducting.

The vehicle dynamic state can include one or more of speed, g-force, and vehicle attitude, for example. These generally indicate the current style in which the car is being driven. For example, a steady high speed indicates a need for a low-drag configuration whereas a more moderate speed may indicate a need for a high grip configuration. High levels of g-force, especially lateral g, indicate that grip is required rather than low drag, as do deviations in vehicle attitude away from a level state (by more than a de minimis amount). Where the control unit takes a single factor into account, one or more preset levels may be chosen in order to delineate different modes. Where multiple such factors are taken into account, a weighted composite value may be compared to one or more preset ranges or a n-dimensional map may be employed.

Thus, when driving at moderate speeds, the fan can be activated to draw air from beneath the car and control the boundary layer of the airflow between the under surface and the ground, thus improving the ground effect that is achieved and providing the vehicle with the necessary level of grip. At higher speeds, for example on a derestricted highway, the fan can be directed to draw air from the upper ducting instead, maintaining laminar flow over the upper surface and reducing aerodynamic drag. The fan preferably exhausts air from a rear face of the vehicle, thus injecting it into the low-pressure zone behind the rear face; this serves to reduce the strength of the low-pressure zone and thus reduce the degree to which air is drawn beneath the car. This then reduces the ground effect, and reduces contribution to the overall aerodynamic drag created by the ground effect.

As a result, the invention allows a choice to be made between enhanced levels of downforce on the one hand, and low drag (or improved "slipperiness") on the other. By providing pre-set thresholds within the control unit, the car can be tailored so that it is optimised for low drag during high speed driving, when tight cornering is unlikely, and optimised for greater downforce at more moderate speeds when lateral grip is more likely to be needed.

The upper ducting and the lower ducting can each comprise one or more valves, to selectively permit or restrict air flow through the ducting. Flap or butterfly valves are suitable. These valves can be controlled by the control unit, along with the fan. Ideally, there is a single fan unit, to which both the upper ducting and the lower ducting lead.

The at least one aperture on the upper surface is preferably located to the rear of the upper surface, in order to provide the desired control of the boundary layer. Likewise, the at least one aperture on the under surface is preferably located towards the rear of the under surface, ideally at a longitudinal position on the vehicle that is substantially aligned with the centre of pressure of the vehicle. The under surface can include a step formation, ahead of which the underside is relatively lower and behind which the underside is relatively higher, and the at least one aperture on the under surface is then preferably located to the rear of the step formation. Generally, the use of the present invention means that the design of the under surface can be less constrained by the needs of ground effect thus allowing other influences to be taken into account to a greater degree.

Given that the fan is present, it can be used for other purposes in addition. For example, further ducting can be provided leading from the engine compartment of the vehicle, and the control unit adapted to cause the fan to draw air through that ducting when certain criteria are met, such as the vehicle speed being below a (further) preset speed, or the engine bay temperature being above a preset limit. Essentially, while the vehicle is at rest or at a low speed, the fan can be used to purge hot air from the engine compartment and thus protect the structure of the vehicle and its power train from excessive temperatures.

Although other drive arrangements for the fan are possible, it is preferably electrically powered as this is likely to be the most convenient. Normally, this would imply that power is provided from the vehicle generator, i.e. driven by the engine. We prefer, however, that the fan can selectably receive electrical power from the generator or from an on-board battery, and that the control unit is adapted to provide power to the fan from the generator when the vehicle speed is below a preset speed, and permit power to be provided to the fan from the battery when the vehicle speed is above that preset speed. Thus, when the vehicle is at or near its Vmax, the engine power that would be needed to drive the generator and provide power for the fan can be provided from the battery instead. Typically, such vehicles spend only a brief period at Vmax so the battery capacity need not be excessive. A control (such as a switch) can be provided, actuatable by a driver within the car, and the control unit adapted to provide power to the fan from the battery when both the vehicle speed is above the preset speed and the control is actuated.

We refer to the "generator" above, by which we mean a source of electrical power for the vehicle that is driven by the engine. This may be a conventional alternator, or it may be some other form of generator. This will usually be determined by other design choices made in respect of the vehicle in question and its powertrain.

Although applicable to vehicles in general, we anticipate that the invention will be most useful when applied to a car, especially a high-performance car.

We refer to various directions in this application. For the avoidance of doubt, these are all defined relative to the vehicle in question. Such vehicles have a defined front and rear, definable in terms of the direction faced by the driver when seated in the vehicle, and/or by the direction of motion achieved by use of the forward and reverse gears. Thus, "forward" is towards the front of the vehicle, and "backward" is towards the rear. A "longitudinal" direction is one aligned with the front/rear axis of the vehicle and a "lateral" direction is transverse to this. The "up" and "down" directions are, of course, away from and towards (respectively) the ground on which the vehicle will usually be in contact with.

BRIEF DESCRIPTION OF THE DRAWINGS

An embodiment of the present invention will now be described by way of example, with reference to the accompanying figures in which.

DETAILED DESCRIPTION OF THE EMBODIMENTS

Figure 1:
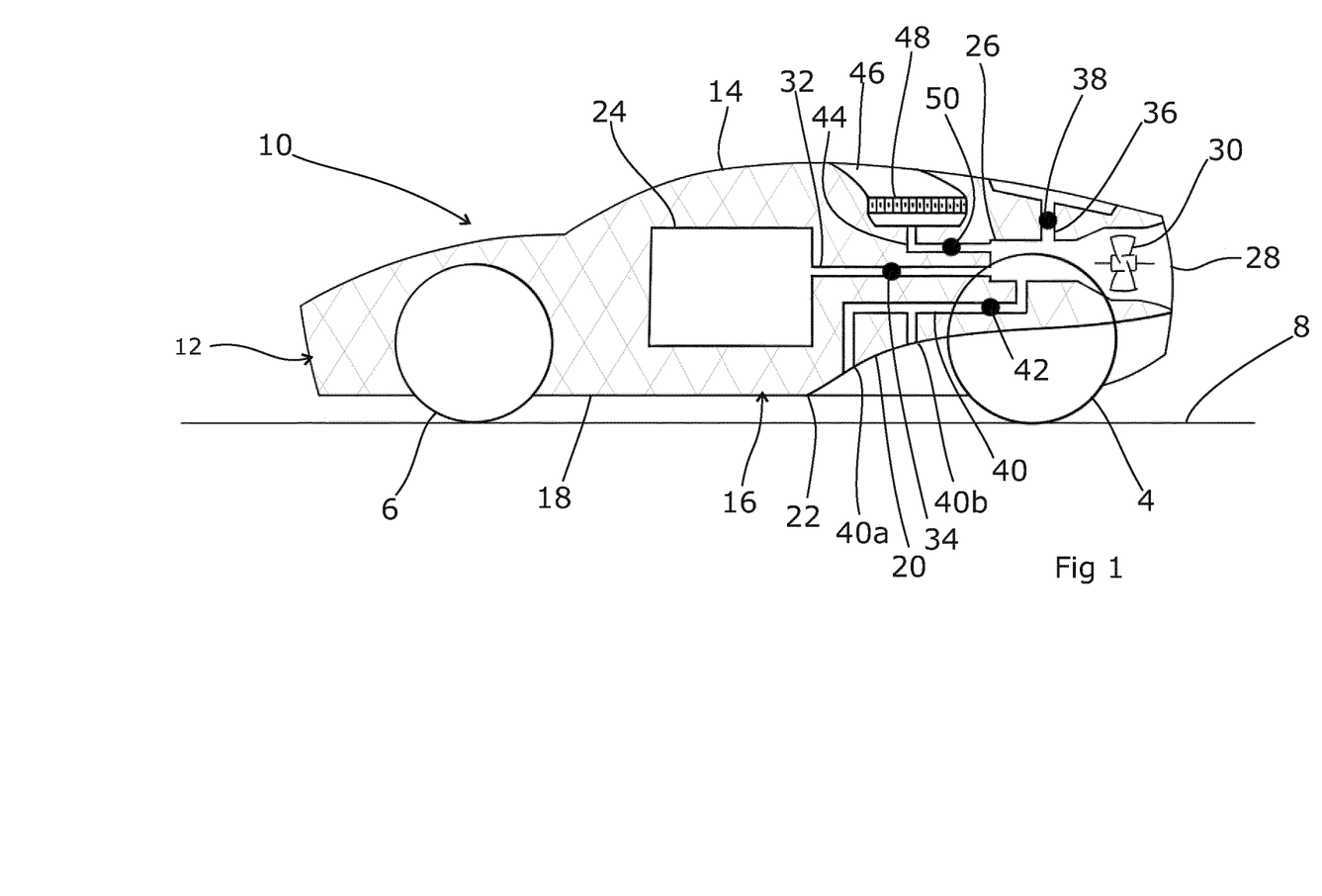
FIG. 1 shows a schematic outline of a vehicle according to the present invention.

FIG. 1 shows a vehicle embodying the present invention, in the form of a car 10 resting on the ground 8 via front and rear wheels 6, 4, which are attached to the car 10 via a suspension arrangement (not shown). The car 10 is shown in schematic form only for clarity; thus the illustration shows a bodyshell 12 comprising an upper body surface 14 and an under-surface 16 that itself consists of a forward undertray 18 and a rearwardly-located diffuser 20. The forward undertray 18 is generally flat, level and smooth in order to allow for a smooth airflow under the car. In some cases, although not illustrated, there may be a leading edge. At a point part way along the underside of the car 10 it transitions at a step 22 to the diffuser 20. The diffuser 20 defines an under-surface to the car 10 which arches upwardly to provide a greater spacing between the under-surface 16 and the ground 8 beneath the rear section of the car 10.

It should be understood that this configuration of the car 10 is merely one example within the range permitted by the present invention. A range of aerodynamic configurations are possible, including but not limited to the illustrated configuration.

Within the vehicle, there is a mid-mounted engine located in an engine compartment shown schematically at 24, together with the necessary ancillaries. The exact location of the engine compartment will, in practice, be dictated by a range of factors but we have illustrated it in a very forward location in order to allow for a clear illustration of the other elements of the invention. Behind the engine, a plenum space 26 is provided, which exhausts to the rear of the car 10 at vent 28. The vent 28 may be covered with a suitable grille or the like. It is located on a generally-upright rear face of the car 10 and thus feeds air into the low-pressure zone behind the car that is created when it is in motion.

A fan 30 is located within the plenum space 26, towards the rear thereof. This is our preferred location for the fan, although it could be located elsewhere within the plenum, or outside the plenum but in fluid communication with it. A single fan is illustrated, but multiple fans may be provided if preferred.

A plurality of flow passages lead to the plenum space from various locations within the car 10. Thus, an engine compartment flow passage 32 leads from the engine compartment 24 to the plenum space 26 via an engine compartment valve 34. An upper flow passage 36 leads from a rear part of the upper body surface 14 to the plenum space 26 via an upper valve 38. A lower flow passage 40 leads from the upper surface of the diffuser element 20 to the plenum space 26 via a lower valve 42. If the diffuser 20 is replaced with an alternative under-surface profile then the lower flow passage 40 can lead to a suitable point on the underside of the vehicle, usually towards the rear section. Finally, (in this example) a cooling flow passage 44 leads from an intake aperture 46 on the car 10 upper body surface 14, via an engine and transmission oil cooler 48 and a cooler valve 50.

The valves may be flap valves, butterfly valves, or any suitable type of valve that is able to open and close the relevant flow passage thereby to allow or substantially throttle or prevent airflow along the flow passage. They may be located along the length of the relevant flow passage, as shown, or at the start of the flow passage, or at its end where it opens into the plenum space. Each flow passage may adopt a solution that is most appropriate to its location and design constraints. They are controlled by a control unit (not shown in FIG. 1) which sends appropriate signals to open, close, partially open or partially close the valves, such as by servo operation. The control unit also receives information from sensors located in various locations on the car 10, providing information such as vehicle speed, vehicle attitude, g-force, outside air temperature, coolant temperature, lubricant temperature, ambient cabin and engine bay temperature, valve position feedback, fan state, etc.

The flow passages may be defined by any suitable form of ducting, such as pipework with a suitable bore, or enclosed passageways defined by wall elements and/or the sides of other elements of the car 10 such as bodywork, chassis parts, etc. They may consist of a single continuous passageway, or (as illustrated for the lower flow passage 40) they may comprise multiple passageways which may join or split along their path, or may follow multiple routes from their source to the plenum space 26. The inlets for the passageways may be located along the vehicle centre-line, or multiple inlets may be provided such as paired left-side and right-side inlets feeding left and right passageways that may merge within the vehicle. Where paired inlets are provided, these will often be shaped and located symmetrically, as most vehicles are left/right symmetric, but this is not essential. The inlets may take the form of openings, or perforated regions, or porous regions of the vehicle bodywork. They may be covered with suitable grilles, or grilles, filters etc may be provided along the passageways.

The above-described arrangement allows the use of an electrically powered fan, ducting and throttle system to enhance vehicle thermal management, performance and efficiency metrics non-linearly with respect to road speed and without creating an inherent demand for movable aerodynamic surfaces. In this example, we provide a number of modes of operation for the car 10, including:

Baseline Mode:
    Fully passive aerodynamics
    Application of electric fan power to generate pressure change and mass flow
    Ducted to powertrain heat exchangers and powertrain bay volume
    Switchable/throttle-able flow control, i.e. on/off/proportional as required
    Fan control automated based upon thermal management demand Increased Vertical Wheel Load Mode:
    Application of electric fan power to generate pressure change and mass flow
    Ducted to tailored underbody geometry
    Switchable/throttle able flow control, on/off/proportion
    Ports on underbody to where suction can be applied
    Suction acts as to manipulate underbody air flow specifically in regions of relatively high boundary thickness and other areas of low energy flow
    Combination of specifically engineered aerodynamics surface and suction capability allows for gross change in airflow
    Gross change applied to engage and disengage specific airflow routes and hence manipulate various aerodynamic performance metrics including; total drag forces, total downforce and effective centre of aerodynamic pressure.
    Downforce (vertical wheel load) magnitude can be uncoupled from linear relationship with vehicle road speed, without the requirement for movable aerodynamic surface.
    Fan control either automated or by user setting
    With an appropriate aerodynamic surface, engaging the fan system has minimal impact on the location of the vehicles aerodynamic centre of pressure, thus increased vertical wheel loading is achieved without significant wheel load distribution change. This is a highly desirable attribute and is not easily achievable with a single aerodynamic device.

Figure 2:
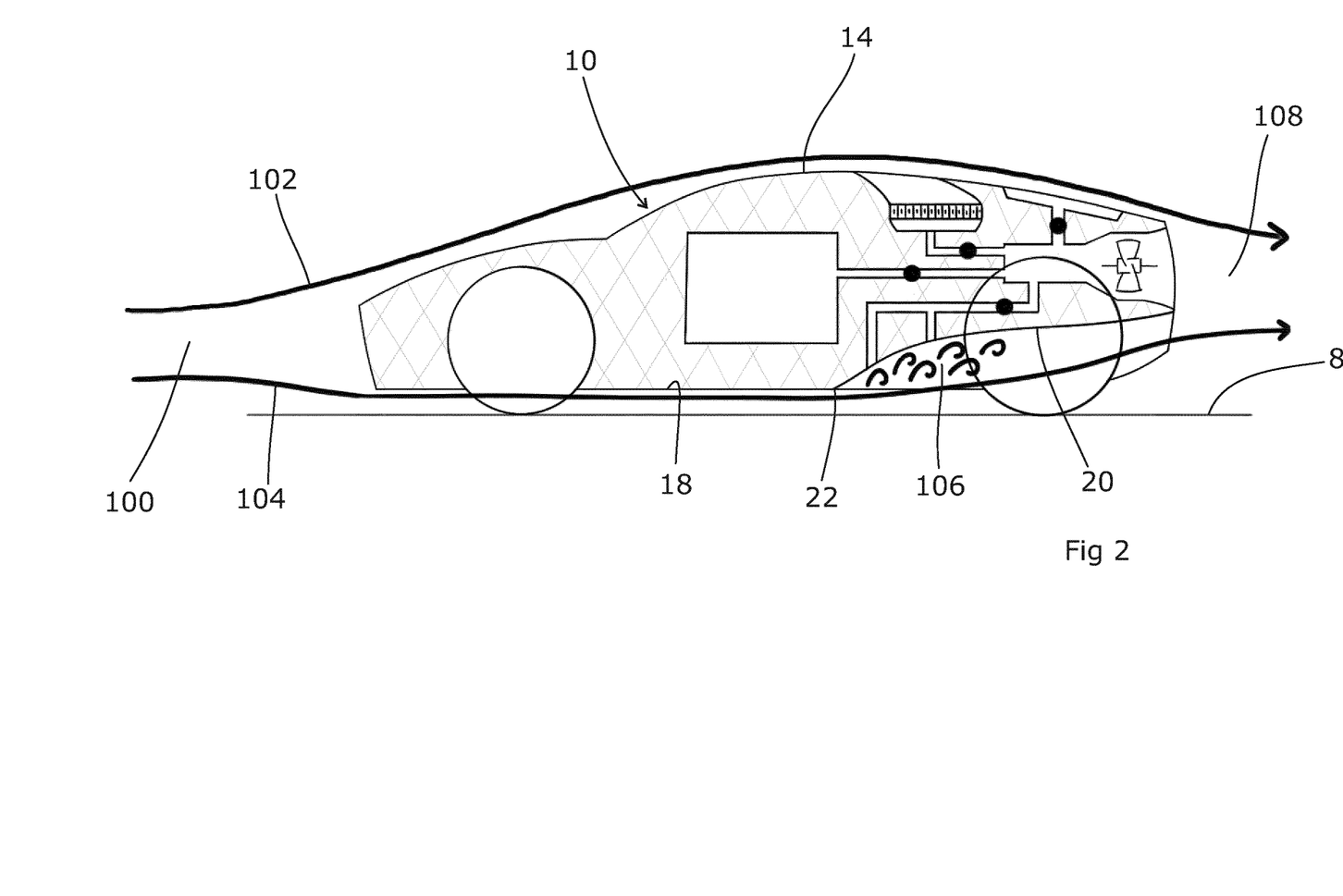
FIG. 2 shows the default aerodynamics of the vehicle of FIG. 1.

Reduced Drag Mode:
    Application of electric fan power to generate pressure change and mass flow
    Ducted to tailored upper body geometry
    Switchable/throttle able flow control, on/off/proportion
    Ports on upper body to where suction can be applied
    Suction acts as to manipulate underbody air flow specifically in regions of relatively high boundary and to remove bulk air mass
    Air mass exhausted by fan ducting to rearward of vehicle modifying wake effective pressure
    Combination effects results in reduced net drag coefficient.
    Fan control either automated or by user setting Maximum Speed Boost:
  As per reduced drag mode using electrical energy store to minimize impact on power traction motor power consumption
  Fan control either automated or by user setting FIG. 2 shows the default aerodynamics of the vehicle, i.e. when operating in the baseline mode. Airflow 100 across the car divides in the normal manner between an upper flow 102 which is diverted upwards over the upper body surface 14, and a lower flow 104 which passes under the car 10 through the gap between the underside 18 and the ground 8. Depending on the severity of the step 22 (if present), there may be vortices 106 in the diffuser 20 behind the step 22.

Figure 3:
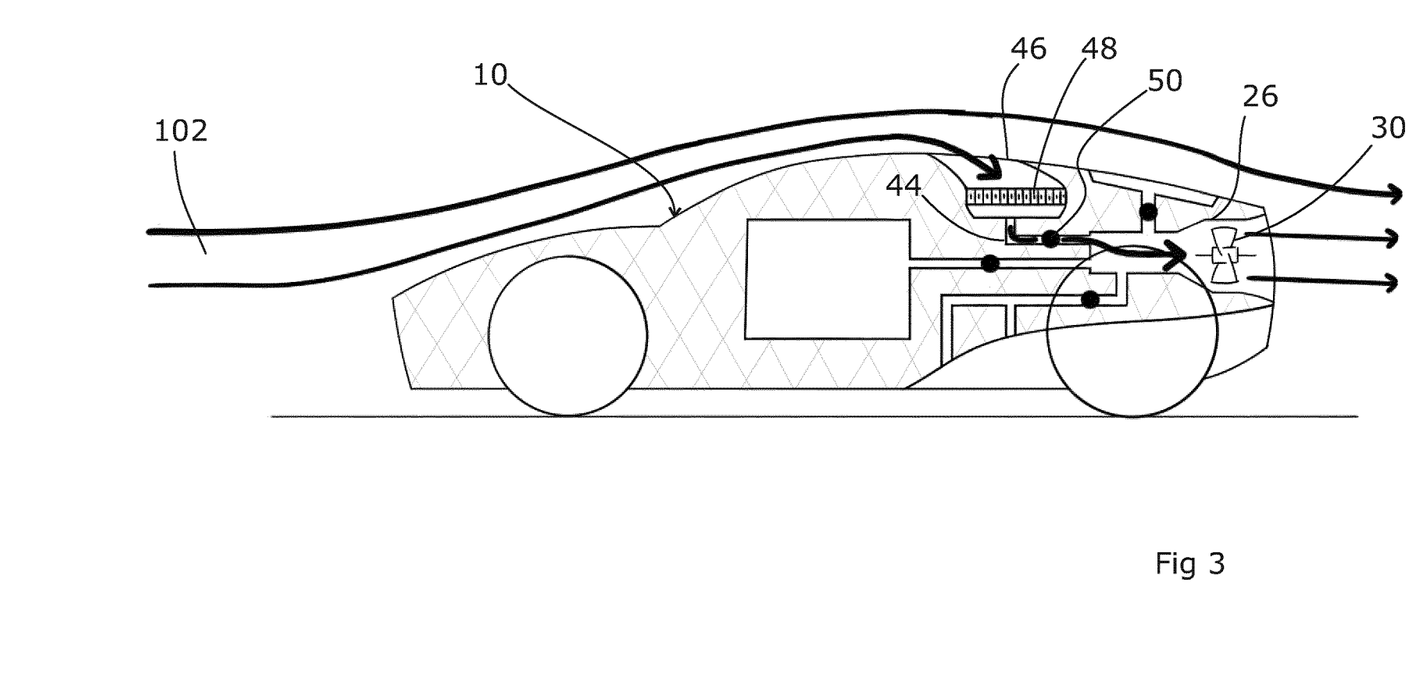
FIG. 3 shows the use of the fan in the vehicle of FIG. 1 to assist in cooling of vehicle systems via a heat exchanger.

FIG. 3 shows the use of the fan 30 to assist in cooling of the transmission system. If a control unit (not shown in FIG. 3) notes that the coolant and/or lubricant temperatures are elevated relative to a preferred operating range, it can activate the fan 30 and open the cooler valve 50 within the cooling flow passageway 44, to draw air from the upper flow 102 through the intake aperture 46 and hence through the engine and transmission oil cooler 48, thus providing additional cooling. The air drawn through the cooling flow passageway 44 will flow into the plenum space 26 and be vented to the rear of the car 10.

Figure 4:
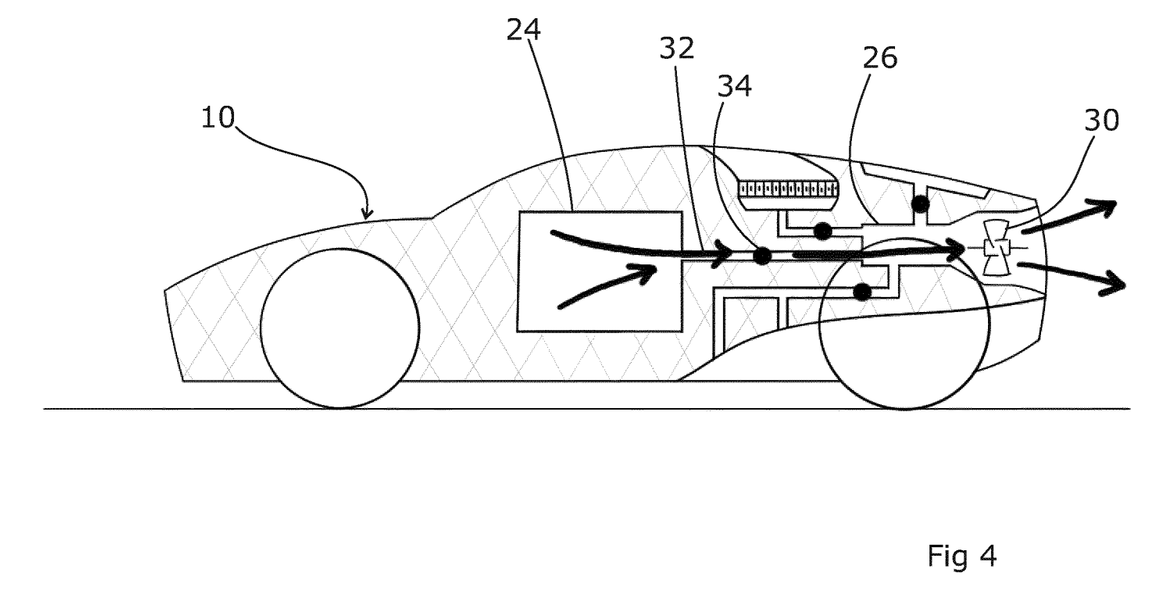
FIG. 4 shows the vehicle of FIG. 1 in an engine bay cooling mode.

FIG. 4 shows the car 10 in an engine bay cooling mode. This may be in concert with, or as an alternative to, the assisted cooling of FIG. 3. The engine compartment valve 34 is opened by the control unit and the fan 30 is activated. Air is then drawn through the engine compartment flow passage 32 from the engine compartment 24, to the plenum space 26 and exits the car 10 at the rear. This removes warm air from the engine compartment 24 and replaces it with (presumed) cool air from outside the car 10.

Both of these modes may be operated individually or together, as required, and may be proportional to the required degree of cooling. Where the required cooling is less than the maximum available, it may be throttles by partial opening of the valve or valves, and/or a reduced fan speed, as required based on the thermal management demand.

Figure 5:
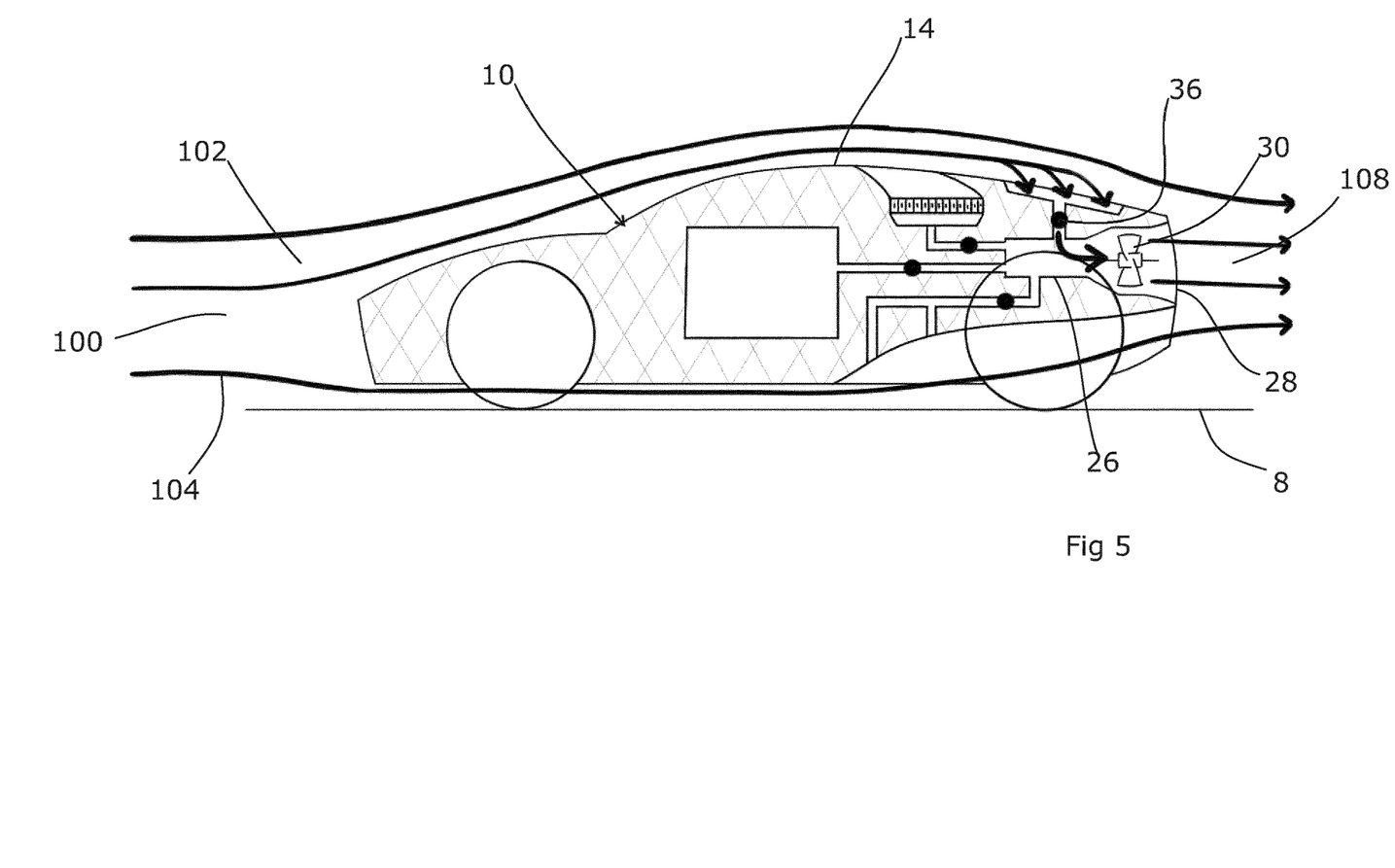
FIG. 5 shows the vehicle of FIG. 1 in a high-speed mode.

FIG. 5 shows the car 10 in a high-speed or reduced-drag mode. Upon sensing a dynamic state of the car 10 that indicates a high-speed, generally straight-line style of driving, the control unit activates the fan 30 and opens the upper flow valve 36. Air is drawn from the upper flow 102 that had been travelling over the upper body surface 14; this has two effects. First, it provides a degree of boundary layer control to the upper flow 102, smoothing the flow and reducing the aerodynamic drag that results. Second, by exhausting the air removed from the upper air flow 102 via the vent 28 (at the rear of the plenum space 26), into the space immediately behind the car 10 as a rear air flow 108, this additional air mass serves to alleviate the low-pressure zone that typically exists behind a fast-moving vehicle. This also assists in reducing the overall aerodynamic drag of the vehicle. In addition, this low pressure zone serves in practice to draw air under the vehicle, increasing the proportion of the airflow 100 that passes under the vehicle as the lower air flow 104. By reducing this low-pressure zone, less air is drawn under the car 10 and the flow through the space between the car 10 and the ground 8 can be smoother and less turbulent, again reducing drag.

The style of driving calling for this reduced-drag mode can include factors such as a high vehicle speed, above a suitable threshold chosen in the light of the overall vehicle performance, a low lateral g-loading, and a generally level vehicle attitude, especially in the lateral direction. This allows the control unit to adopt this mode in a fully automated manner. Alternatively (or in addition), the mode could be available for manual activation by the driver as and when required or desired.

Figure 6:
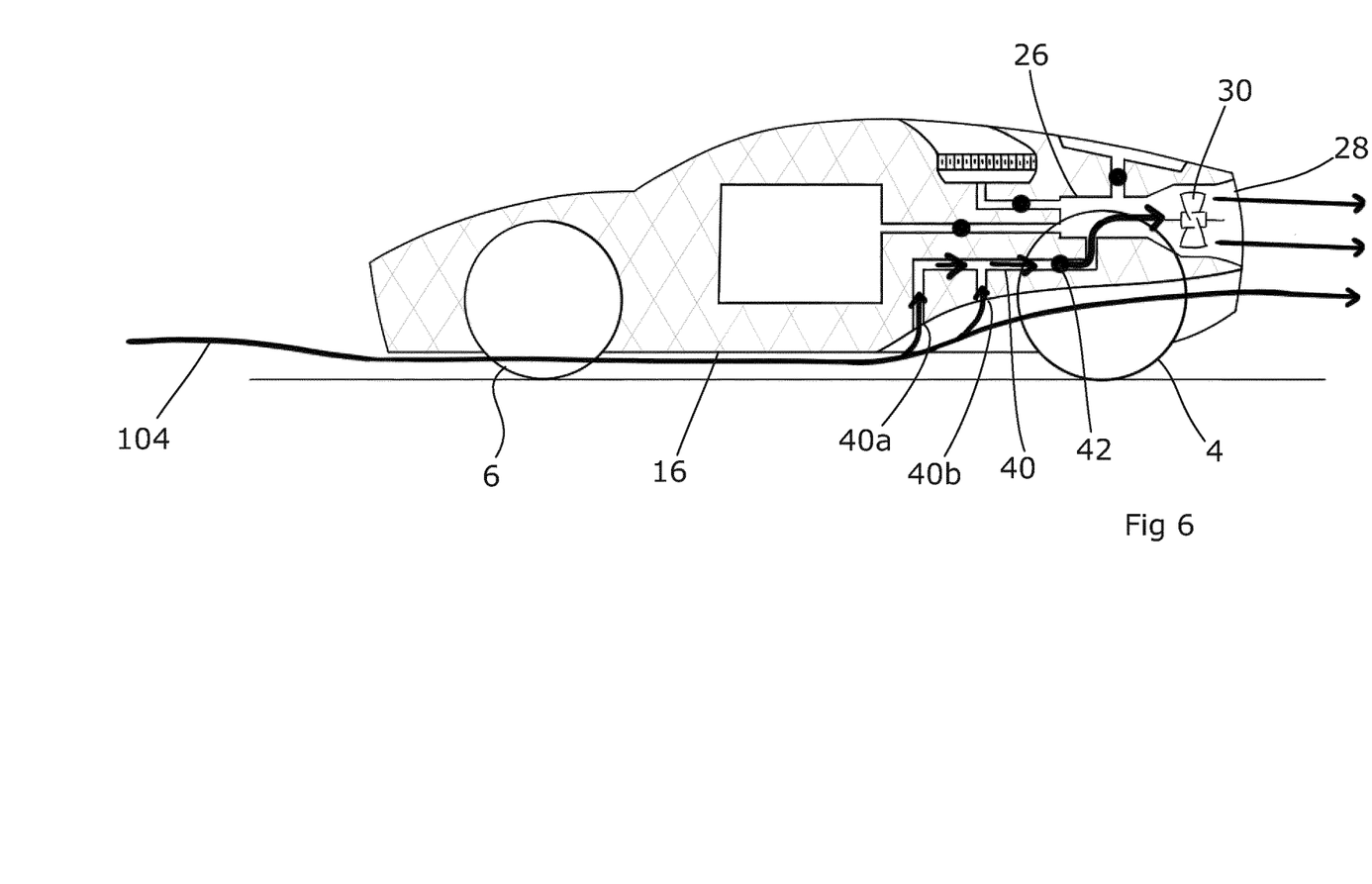
FIG. 6 shows the vehicle of FIG. 1 in a high-downforce mode.

FIG. 6 shows the car 10 in a high-downforce or increased vertical wheel load mode. When the control unit notes that the car 10 is being driven in a dynamic mode, it activates the fan 30 and opens the lower valve 42, thereby drawing air from the lower air flow 104 beneath the vehicle and exhausting it to the rear by way of the lower flow passage 40, the plenum space 26, and the vent 28. This assists the air flow under the car 10, reducing turbulence and vortices, and thus increasing the air flow in terms of both mass and speed. This enhances the venturi effect created between the under-surface 16 of the car 10 and the ground 8, creating an aerodynamic force drawing the car 10 downwards and increasing the loading on the wheels 6, 4 in response. This increased wheel loading then provides the greater grip levels needed in order to sustain the dynamic style of driving.

The style of driving calling for this increased vertical wheel load mode can include factors such as a reasonable vehicle speed, a higher g-loading, especially lateral g-loading, and a vehicle attitude that is either non-level or is often diverging from level, especially in the lateral direction. This allows the control unit to adopt this mode in a fully automated manner. Alternatively (or in addition), the mode could be available for manual activation by the driver as and when required or desired.

The openings 40a, 40b for the lower flow passage 40 are located on the under-surface 16 of the car 10 at a position that is aligned in the longitudinal direction with the car's centre of pressure. As a result, the effect of the fan 30 is provided in an area where it does not affect the aerodynamic balance of the car 10, and simply introduces additional downforce. This is useful in ensuring the stability of the car 10 is maintained while the high-downforce mode is activated or de-activated, and ensuring that the handling is consistent across the various modes of the car 10.

Figure 7:
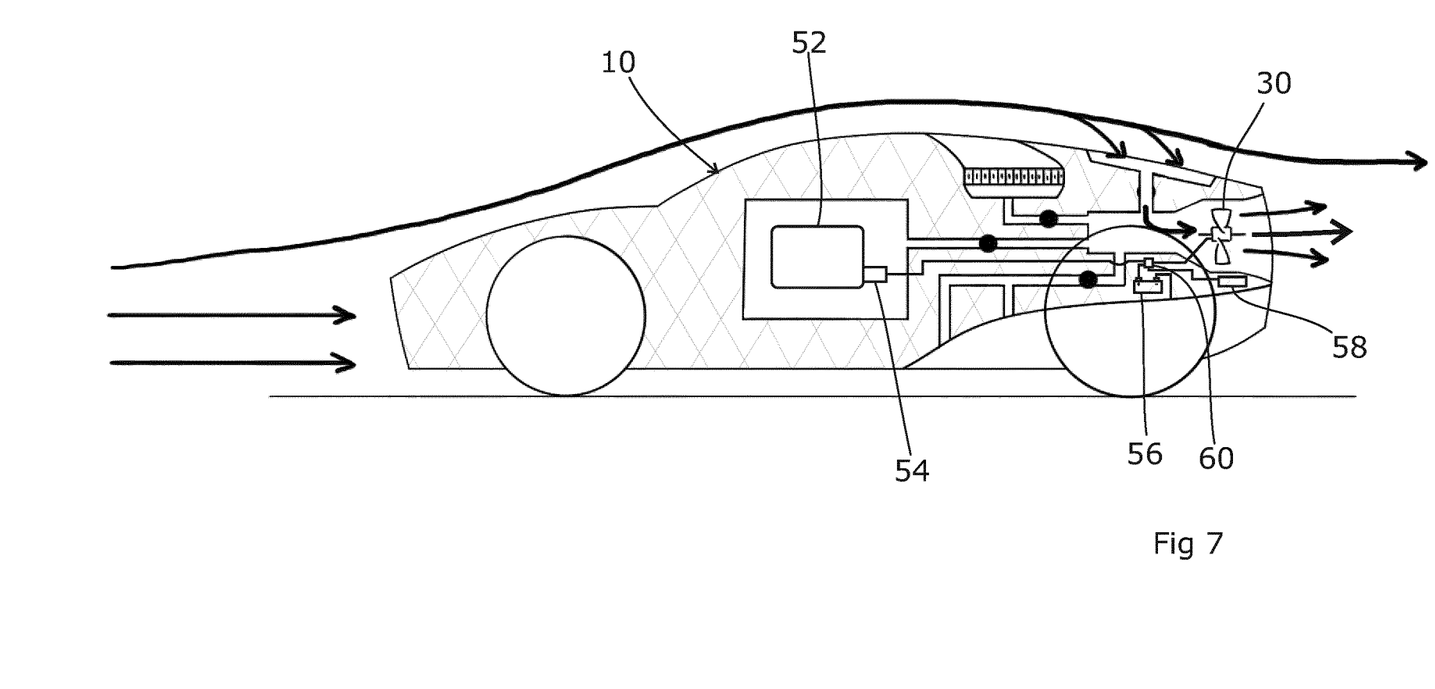
FIG. 7 shows the vehicle of FIG. 1 in a maximum speed boost mode.

FIG. 7 shows the car 10 in a maximum speed boost mode. This will be adopted, or made available for selection, when the car 10 is near its maximum speed (or Vmax), and hence the control unit is likely to have already adopted the low-drag mode. Thus, the upper valve 38 will be open and the fan 30 active, drawing air from the upper air flow 102 as shown in FIG. 5. FIG. 7 shows some additional components of the car 10, including an engine 52 which drives a generator 54 from which the car's systems principally derive power. Vehicles commonly use an alternator as their generator, but other forms of generator are also known and available, and in this invention the generator may be any device which provides electrical power and is driven by the engine 52. A battery 56 is also provided, which may also be used to start the car 10 and run the car's systems when the engine is stationary, or may be provided in addition to a battery dedicated to that purpose. The control unit is shown schematically as 58; t controls a relay 60 (or other form of electrical switch) which provides power to the fan 30 either from the generator or from the battery 56.

As the car 10 approaches its Vmax, the engine 52 is generally operating at maximum power. Some of that power will inevitably be required in order to drive the generator 54 and is therefore not available to drive the car 10. According to the present invention, when in the maximum speed boost mode the control unit 58 triggers the relay 60 to provide power to the fan 30 instead of the generator 54. This may be specifically for the fan 30, or it may be provided for one or more other systems within the car 10. This therefore reduces the load on the generator 54 and hence reduces the power demanded of the engine 52 by the generator 54. This power can then be provided to the drivetrain instead, allowing a higher Vmax and a quicker approach to that Vmax.

Clearly, this mode is not sustainable in the long term, as eventually the battery 56 will be exhausted. However, cars rarely sustain their Vmax for long periods, usually due to limitations imposed by the available road space and/or driver fatigue. Therefore, the maximum speed boost mode is not expected to be needed for longer than a short period, after which the car 10 can return to the low-drag mode only and the generator 54 can be used to recharge the battery 56.

The indicators to the control unit 58 that maximum speed boost mode is needed will be relatively simple; the car will likely be in reduced drag mode, and approaching its Vmax (i.e. within a specified range of a preset Vmax). The mode could be entered automatically, or an indication could be provided to the driver that it is available subject to them activating a control. Given the context of the mode, that control should ideally be prominent and easily accessible without needing the driver to take their hands off the driving controls of the car.

Thus, the maximum speed boost mode uses an electrical energy store to minimize the impact on power traction motor power consumption.

As a result of the invention, the car can adopt one of a number of modes in response to the current driving style and conditions. Various measurements can be provided to the control unit, combined (with suitable weightings applied), and a decision made. Alternatively, or in addition, the driver can be permitted to select a mode based on their intentions at the time. Feedback can be provided to the driver as to the current mode so that they are aware of the vehicle handling characteristics that will be exhibited.

It will of course be understood that many variations may be made to the above-described embodiment without departing from the scope of the present invention.

The invention claimed is:

1. A vehicle having external bodywork including an upper surface and an under surface,
   the under surface having at least one aperture, and the vehicle comprising lower ducting located within the external bodywork and communicating with that aperture,
   the upper surface having at least one aperture, and the vehicle comprising upper ducting located within the external bodywork and communicating with that aperture,
   the upper ducting and the lower ducting leading to a fan adapted to selectively draw air through the respective ductings,
   the vehicle further comprising a control unit adapted to receive information as to the vehicle dynamic state and, dependent on that state, draw air through the lower ducting or through the upper ducting.

2. A vehicle according to claim 1 in which the vehicle dynamic state includes one or more of speed, g-force, and vehicle attitude.

3. The vehicle according to claim 1 in which the vehicle dynamic state comprises a speed measurement and, below a preset speed the control unit draws air through the lower ducting and above a preset speed the control unit draws air through the upper ducting.

4. The vehicle according to claim 1 in which the vehicle dynamic state comprises a g-force measurement and, above a preset g-force the control unit draws air through the lower ducting and below a preset g-force the control unit draws air through the upper ducting.

5. The vehicle according to claim 4 in which the g-force measurement is a lateral g-force.

6. The vehicle according to claim 1 in which the vehicle dynamic state comprises a vehicle attitude measurement and, where the attitude differs from level by more than a preset amount, the control unit draws air through the lower ducting and above a preset amount the control unit draws air through the upper ducting.

7. The vehicle according to claim 1, wherein the upper ducting and the lower ducting each comprise valves to selectively permit or restrict air flow through the ducting.

8. The vehicle according to claim 7 in which the control unit controls the valves and the fan.

9. The vehicle according to claim 1 in which both the upper ducting and the lower ducting lead to a single fan unit.

10. The vehicle according to claim 1 in which the fan exhausts air from a rear face of the vehicle.

11. The vehicle according to claim 1 in which the at least one aperture on the upper surface is located to the rear of the upper surface.

12. The vehicle according to claim 1 in which the at least one aperture on the under surface is located to the rear of the under surface.

13. The vehicle according to claim 1 in which the at least one aperture on the under surface is located at a longitudinal position on the vehicle that is substantially aligned with the centre of pressure of the vehicle.

14. The vehicle according to claim 1 in which the under surface includes a step formation, ahead of which the under side is relatively lower and behind which the under side is relatively higher, and the at least one aperture on the under surface is located to the rear of the step formation.

15. The vehicle according to claim 1, further comprising an engine compartment and ducting leading from the engine compartment, wherein the control unit is adapted to cause the fan to draw air through that ducting when the vehicle speed is below a further preset speed.

16. The vehicle according to claim 1, in which the fan is electrically powered.

17. The vehicle according to claim 16 in which the vehicle further comprises an engine, an generator driven by the engine, and a battery, wherein the fan can selectably receive electrical power from the generator or the battery, and the control unit is adapted to provide power to the fan from the generator when the vehicle speed is below a preset speed, and permit power to be provided to the fan from the battery when the vehicle speed is above that preset speed.

18. The vehicle according to claim 17 further comprising a control actuatable by a driver within the car, and wherein the control unit is adapted to provide power to the fan from the battery when both the vehicle speed is above the preset speed and the control is actuated.

19. The vehicle according to claim 1, being a car.

* * * * *